United States Patent
Lee et al.

(10) Patent No.: US 10,605,448 B2
(45) Date of Patent: Mar. 31, 2020

(54) BOILER USING LIQUID METAL AS WORKING MEDIUM AND POWER GENERATION SYSTEM COMPRISING SAME

(71) Applicant: KOREA INSTITUTE OF INDUSTRIAL TECHNOLOGY, Chungcheongnam-do (KR)

(72) Inventors: Uen Do Lee, Daejeon (KR); Won Yang, Seoul (KR); Byung Ryeul Bang, Seoul (KR); Soo Hwa Jeong, Busan (KR); Ji Hong Moon, Chungcheongnam-do (KR)

(73) Assignee: KOREA INSTITUTE OF INDUSTRIAL TECHNOLOGY, Chungcheongnam-Do (KR)

( * ) Notice: Subject to any disclaimer, the term of this patent is extended or adjusted under 35 U.S.C. 154(b) by 61 days.

(21) Appl. No.: 15/536,959

(22) PCT Filed: Dec. 18, 2015

(86) PCT No.: PCT/KR2015/013960
§ 371 (c)(1),
(2) Date: Jun. 16, 2017

(87) PCT Pub. No.: WO2016/099208
PCT Pub. Date: Jun. 23, 2016

(65) Prior Publication Data
US 2017/0350586 A1    Dec. 7, 2017

(30) Foreign Application Priority Data

Dec. 19, 2014 (KR) .................. 10-2014-0184356

(51) Int. Cl.
*F22B 1/06*    (2006.01)
*F01K 25/12*    (2006.01)
(Continued)

(52) U.S. Cl.
CPC ............. *F22B 1/06* (2013.01); *F01D 15/10* (2013.01); *F01K 11/02* (2013.01); *F01K 25/00* (2013.01);
(Continued)

(58) Field of Classification Search
CPC .......... F01K 25/00; F01K 25/12; F01K 11/02; F01K 25/103; F02C 1/04; F01D 15/10; F05D 2220/31; F22B 1/06
(Continued)

(56) References Cited

U.S. PATENT DOCUMENTS 1,982,745 A * 12/1934 Koenemann ............... B01J 3/08
                                                              122/32
3,007,306 A * 11/1961 Martin .................... F01K 25/12
                                                              376/318
(Continued)

FOREIGN PATENT DOCUMENTS

CN    203070789 U    7/2013
JP    S63149587 A    6/1988
(Continued)

OTHER PUBLICATIONS

China Patent Office, Office Action, (dated Jul. 23, 2018), (in Chinese).
Takahashi et al. "Design study on reactor structure of Pb—Bi-cooled direct contact boiling water fast reactor (PBWFR)", Science Direct, Progress in Nuclear Energy, Mar.-Aug. 2008, p. 197-205, vol. 50, issues 2-6.

*Primary Examiner* — Hoang M Nguyen
(74) *Attorney, Agent, or Firm* — McNees Wallace & Nurick LLC

(57) ABSTRACT

The boiler using a liquid metal as a working medium according to the present invention is comprises: a combustion furnace, in which the working medium is supplied and heated; a heat exchange part, which is connected to the combustion furnace and to which the working medium heated in the combustion furnace is supplied; a heat medium
(Continued)

injection part, which is positioned in the heat exchange part; and a supply part, which is connected to the heat exchange part and supplies the heat medium to the heat medium injection part. In the heat exchange part, the heat exchange between the heat medium supplied to the heat medium injection part and the heated working medium is performed. The heat medium reaches high temperature and high pressure states at a threshold point or higher by means of the heat exchange. In addition, the working medium is a liquid metal.

6 Claims, 3 Drawing Sheets

(51) Int. Cl.
  *F02C 1/04* (2006.01)
  *F01K 25/00* (2006.01)
  *F01D 15/10* (2006.01)
  *F01K 11/02* (2006.01)
  *F01K 25/10* (2006.01)

(52) U.S. Cl.
  CPC ............... *F01K 25/12* (2013.01); *F02C 1/04* (2013.01); *F01K 25/103* (2013.01); *F05D 2220/31* (2013.01)

(58) Field of Classification Search
  USPC .................. 60/649, 651, 671, 653, 677–680
  See application file for complete search history.

(56) References Cited

U.S. PATENT DOCUMENTS

| | | | | |
|---|---|---|---|---|
| 3,516,249 A | * | 6/1970 | Paxton | F01K 23/04 60/651 |
| 3,604,207 A | * | 9/1971 | Waidelich | F01K 23/04 60/262 |
| 3,646,760 A | * | 3/1972 | Waidelich | F02C 1/007 60/204 |
| 3,783,614 A | * | 1/1974 | Walker | F01D 25/08 60/39.08 |
| 6,138,456 A | * | 10/2000 | Garris | C09K 5/041 417/178 |
| 6,530,420 B1 | * | 3/2003 | Takada | C09K 5/04 165/104.33 |
| 2002/0071515 A1 | | 6/2002 | Boardman et al. | |
| 2016/0160845 A1 | * | 6/2016 | Weaver | F03G 7/05 60/641.7 |

FOREIGN PATENT DOCUMENTS

| | | |
|---|---|---|
| JP | 2002214386 A | 7/2002 |
| KR | 1020040081958 A | 9/2004 |
| KR | 1020100104563 A | 9/2010 |
| KR | 101035547 B1 | 12/2010 |
| KR | 1020120033458 A | 4/2012 |
| KR | 1020130073020 A | 7/2013 |

\* cited by examiner

[Fig. 1]
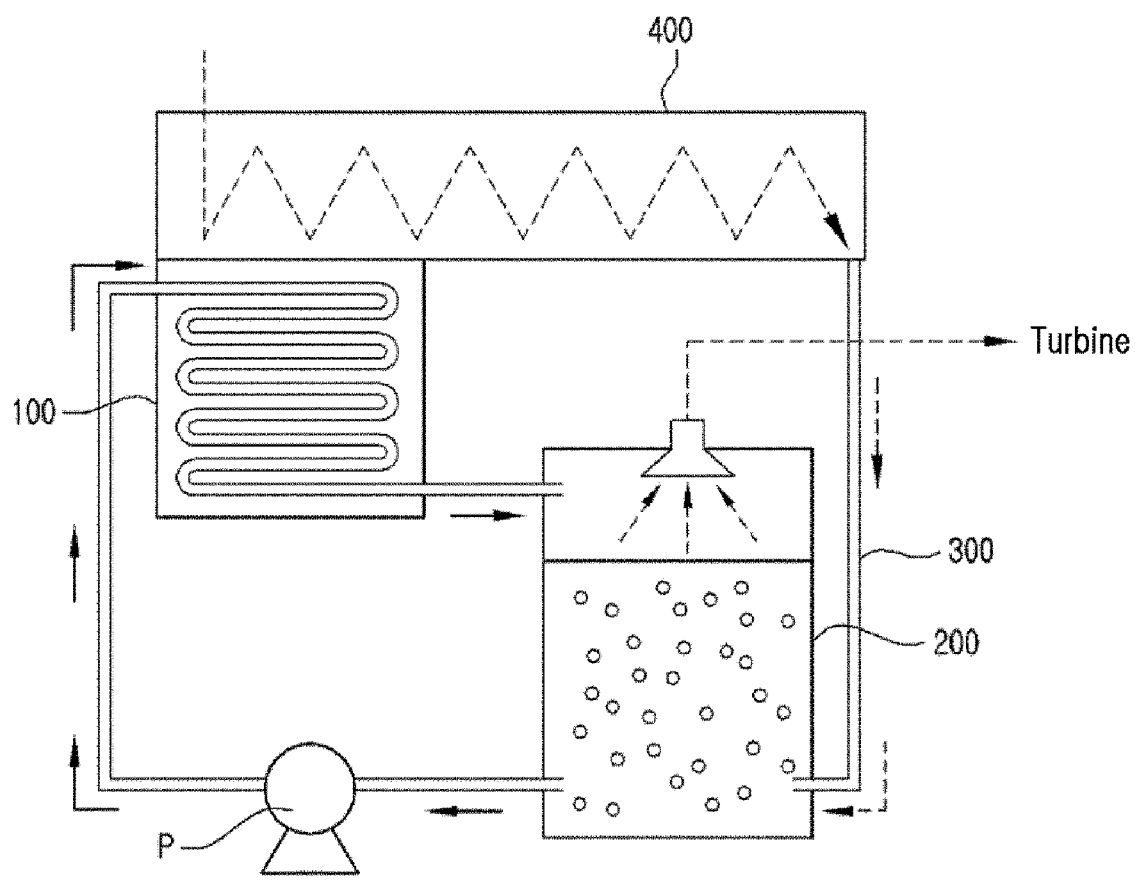

[Fig. 2]
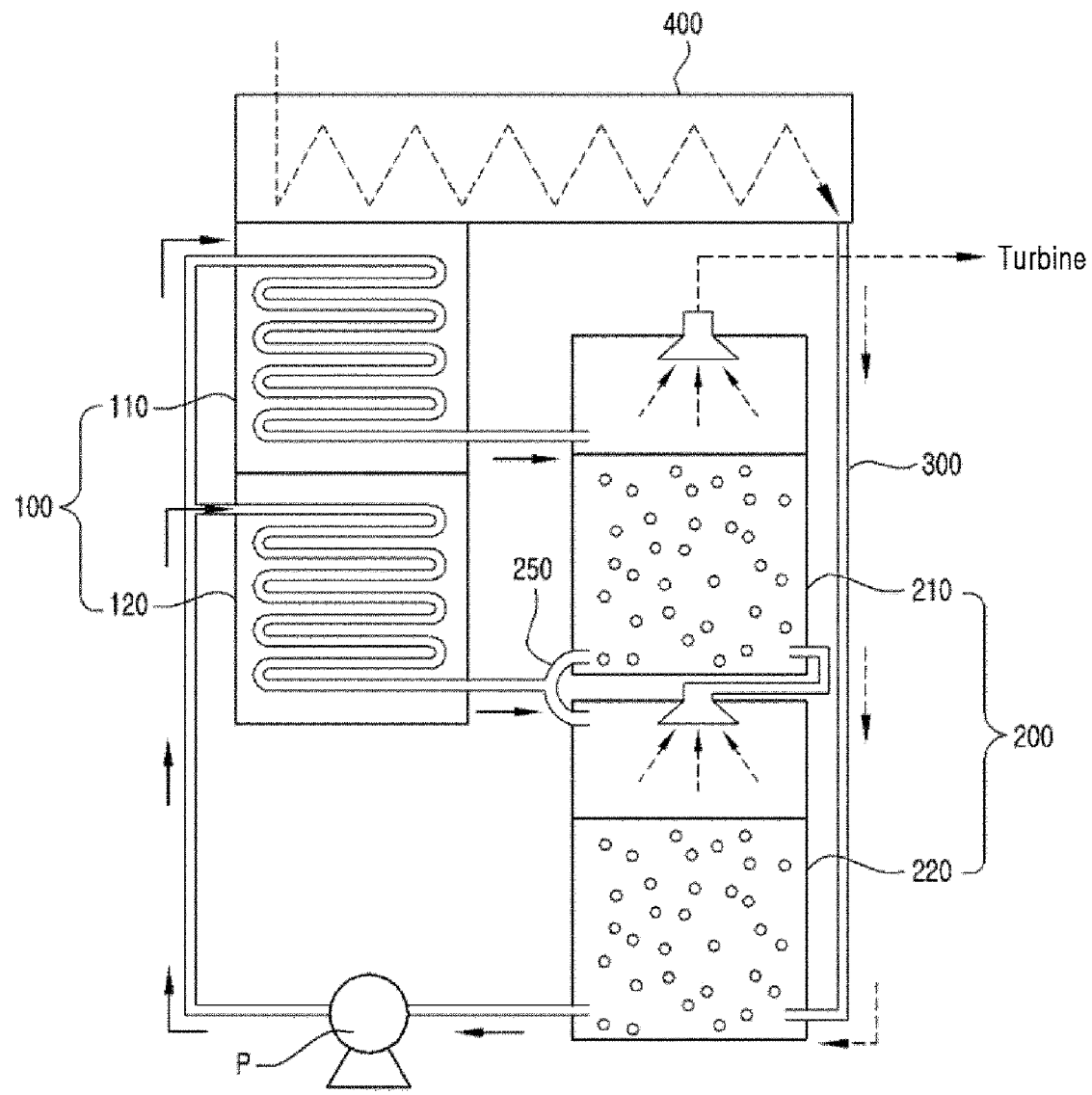

[Fig. 3]
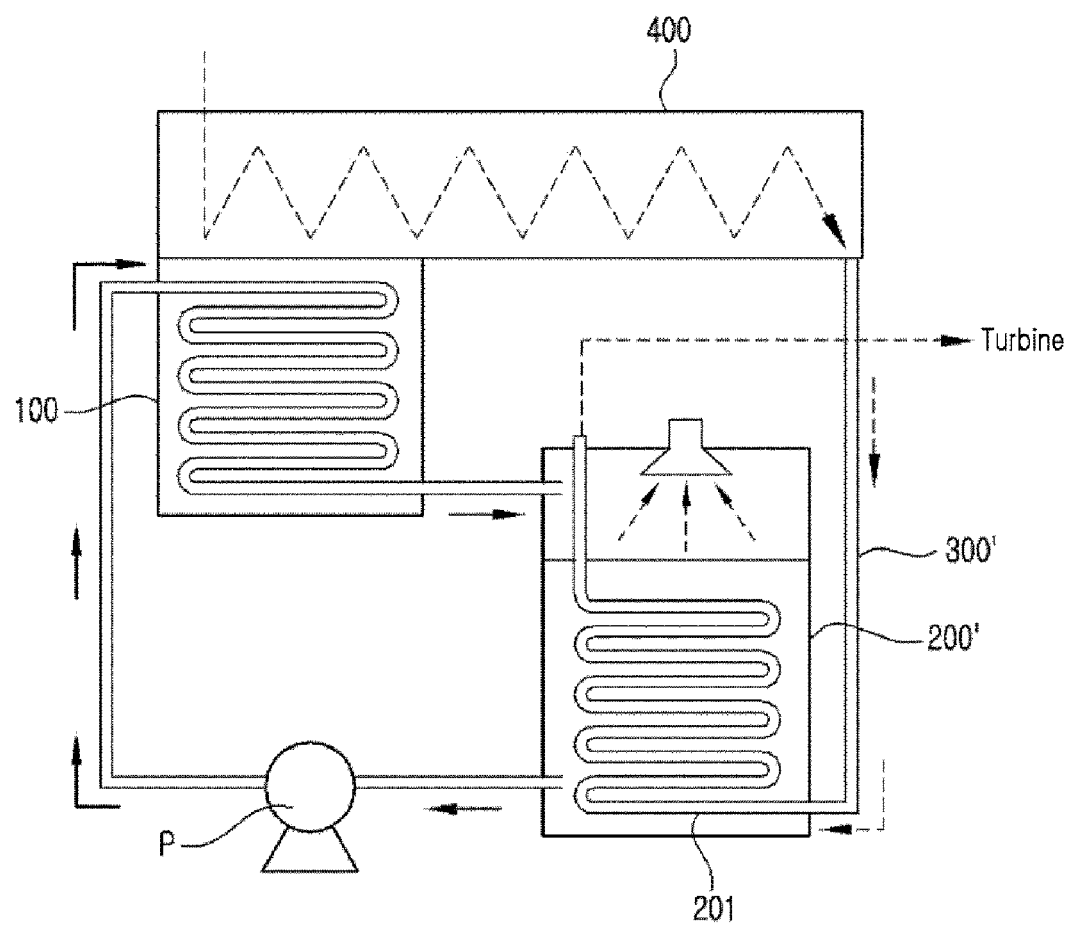

BOILER USING LIQUID METAL AS WORKING MEDIUM AND POWER GENERATION SYSTEM COMPRISING SAME

TECHNICAL FIELD

The present invention relates to a boiler, more specifically to a boiler producing a heat medium at high-temperature and high-pressure states using a liquid metal as a working medium, and a power generation system comprising the same.

The present invention was carried out at Korea Institute of Industrial Technology supported by Ministry of Strategy and Finance according to an RCOE promotion project, and was carried out in 2015 in the research title of "next generation energy production system against climate change" with assignment identification number EO150006.

BACKGROUND ART

Conventionally, a boiler used in vapor production or power generation is equipped with numerous water pipes therein, supplies water thereto, obtains vapor at high temperature and pressure, and uses the same as a heat source or a steam turbine.

In particular, in case of power generation, as efficiency of Rankin cycle using the steam turbine increases as temperature and pressure of steam increase, it is critical to obtain steam at high temperature and pressure to improve efficiency of power generation.

As an example, in case of a pulverized coal boiler for coal thermal power generation that is currently commercialized adopts the ultra super critical (USC) conditions of main steam pressure of 241 bar, main steam temperature of 566° C., and reheat steam temperature of 593° C. For an improved efficiency, a boiler suitable to hyper-super critical (HSC) condition of steam temperature of 700° C. or higher is under development.

Likewise, in order to generate steam at a high temperature and pressure, numerous heat medium injection parts (or heat exchange tubes) need to be installed inside the boiler for steam production. In particular, properties of the material of the heat medium injection part of a high temperature part which can endure a steam condition of increasing temperature and pressure as they increase are important. In case of a USC boiler, very high-cost steel is used, but a material capable of enduring much higher temperature and pressure of steam for a HSC boiler has not been commercialized.

At a part where the steam is maintained at high temperature and pressure, heat transfer becomes particularly important and durability of welding and corrosion resistance of the heat medium injection part are considered very important during production process, causing a high price of the boiler. In most cases, however, the heat medium injection part breaks down, leading to a huge damage.

Meanwhile, there has recently been an effort in using carbon dioxide instead of water as a working medium of a boiler all over the world including South Korea. Carbon dioxide has its critical temperature and pressure at 31.04° C. and 72.8 atm, respectively, and becomes supercritical state at a temperature below supercritical temperature and pressure of water at 374° C. and 218 atm, respectively. Additionally, it is known that the turbine using the supercritical $CO_2$ as a working medium has an effect of decrease in size compared to the steam turbine.

However, a material capable of enduring supercritical $CO_2$ at high temperature and pressure when using $CO_2$ in a conventional boiler is still under investigation.

As an example of conventional technology, Korean Patent Publication No. 2010-0104563 discloses a boiler which indirectly heats the heat medium injection part using a working medium such as oil to solve a problem caused by directly heating the heat medium injection part. However, as a boiling point of the oil as a medium for heating the heat medium injection part is between about 250° C. and 350° C., it is impossible to make the heat medium be in a supercritical or ultra supercritical state as described above.

DISCLOSURE

Technical Problem

In this regard, the present invention has been contrived in order to resolve the conventional problems described above. The present invention provides a boiler using a liquid metal capable of producing a heat medium at critical temperature and pressure or higher without breaking down a heat medium injection part in which a heat medium flows, and a power generation system using the same.

Technical Solution

To achieve the above-described object, the boiler using the liquid metal according to the present invention as a working medium is a boiler which circulates the working medium so as to perform a heat exchange with a heat medium and comprises: a combustion furnace, into which the working medium is supplied and heated; a heat exchange part, which is connected to the combustion furnace and into which the working medium heated in the combustion furnace is supplied; a heat medium injection part, of which a side is connected to the heat exchange part; and a supply part, which is connected to the other side of the heat medium injection part and supplies the heat medium to the heat medium injection part via the heat exchange part. In the heat exchange part, the heat exchange between the heat medium supplied to the heat medium injection part and the heated working medium is performed. The heat medium reaches high-temperature and high-pressure states at a threshold point or higher by means of the heat exchange. In addition, the working medium is a liquid metal.

The liquid metal at a temperature decreased to the predetermined temperature or lower by the heat exchange is supplied to the combustion furnace, heated therein, and then re-supplied to the heat exchange part, generating recirculation of the liquid metal. A temperature at which the liquid metal is re-heated is preferably higher than the melting point of the liquid metal.

Additionally, as a boiler performing heat exchange with a heat medium by circulating a working medium, the present invention provides a boiler which circulates working media to perform a heat exchange with a heat medium, comprising: two or more combustion furnaces into which the working media heated up to different temperatures are supplied; two or more heat exchange parts which are connected to a corresponding number of combustion furnaces and to which the working media heated at different temperatures in each combustion furnace are supplied; a heat medium injection part in which one side thereof supplies the heat medium to the heat exchange part with the lowest temperature among the heat exchange parts; and a supply part which is connected to the other side of the heat medium injection part and supplies the heat medium thereto, wherein the heat exchange of the heat medium supplied from an end of the heat medium injection part and the working media is performed in two or more heat exchange parts, wherein the heat medium gradually reaches high-temperature and high-pressure states at a threshold point or higher by means of the heat exchange, and the working medium is a liquid metal.

The liquid metal at a temperature decreased to the predetermined temperature or lower by the heat exchange is supplied to the combustion furnace heated at the lowest temperature among the combustion furnaces, re-heated and re-supplied to one of the heat exchange parts, thereby recirculating the liquid metal, wherein a temperature at which the liquid metal is reheated is preferably higher than the melting point of the liquid metal.

Additionally, the present invention provides a boiler, which circulates working media to perform a heat exchange with a heat medium, comprising a combustion furnace, into which the working medium is supplied and heated; a heat exchange part, which is connected to the combustion furnace and to which the working medium heated in the combustion furnace is supplied; a tube, which is positioned in the heat exchange part; a heat medium injection part, in which one side thereof is connected to the tube; and a supply part, which is connected to the other side of the heat medium injection part and supplies the heat medium to the tube in the heat exchange part, wherein heat exchange between the heat medium supplied through the tube and the heated working medium is performed in the heat exchange part, wherein the heat medium reaches high-temperature and high-pressure states at a threshold point or higher by means of the heat exchange, and the working medium is a liquid metal.

Additionally, the present invention provides a power generation system, comprising a boiler using the liquid metal as a working medium; and a turbine for generating electrical power using a heat medium in high-temperature and high-pressure states at a threshold point or higher.

The liquid metal is preferably selected from the group consisting of tin, bismuth, lead, and gallium.

Advantageous Effects

When a liquid metal is supplied to the injection part (tube) inside the combustion furnace as a working medium, a problem of thermal stress in the injection part or tube related to a phase change generated when heating by directly supplying a heat medium such as water or carbon dioxide thereto can be resolved. In particular, a problem caused by a breakdown of the injection part, which is caused when the heat medium is in supercritical state and influences properties of injection part material, can be fundamentally prevented, thereby significantly increasing lifetime of the heat medium injection part. Additionally, the present invention is advantageous in that a more economic system can be constituted by using a material capable of enduring the ultra supercritical condition only at the part producing the heat medium at high temperature and pressure of the critical point or higher due to heat exchange of the liquid metal and heat medium, and efficiency of the power generation system can be improved by heating the heat medium in the heat exchange part in which the liquid metal having a constant temperature is present more stably. Additionally, by adding a function of storing the heat produced in the combustion furnace for a certain period of time through control of an amount and temperature of the liquid metal used as a working medium, an effect of capability to respond to fluctuation of electricity needs can be achieved.

DESCRIPTION OF THE DRAWINGS

FIG. 1 is a schematic diagram of a boiler using a liquid metal according to an exemplary embodiment as a working medium.

FIG. 2 is a schematic diagram of a boiler using a liquid metal according to another exemplary embodiment as a working medium.

FIG. 3 is a schematic diagram of a boiler using a liquid metal according to still another exemplary embodiment as a working medium.

MODE FOR INVENTION

The objects, features, and other advantages of the present invention as described above will be apparent from the appropriate exemplary embodiments of the present invention in detail. In this process, thicknesses of lines or sizes of constituent elements illustrated in the drawings may be exaggerated for clarity and convenience in explanation. Further, all terms to be described later are defined in consideration of functions in the present invention, and may differ depending on users, operator's intentions, or customs. Accordingly, definition of such terms should be disclosed based on the contents over the whole description of the invention.

Additionally, the described exemplary embodiments are provided for illustrative purposes only and are not intended to limit the technical scope of the present invention.

Each constitutional element of the boiler using the liquid metal of the present invention as a working medium and power generation system using the same may be used as an integrated form or separated and used respectively. Further, depending on a form of use, some of the constituent elements may be omitted.

Hereafter, the boiler using the liquid metal according to an exemplary embodiment of the present invention (hereinafter, for convenience of description, it is referred to "boiler") and the power generation system using the same will be described in detail with reference to the accompanying drawings (FIG. 1).

FIG. 1 is a schematic diagram of a boiler using a liquid metal according to an exemplary embodiment as working medium, wherein the solid arrows represent the flow of the liquid metal and dashed arrows represent the flow of the heat medium.

As shown in FIG. 1, the boiler according to an exemplary embodiment of the present invention may comprise a combustion furnace 100, heat exchange part 200, heat medium injection part 300, and supply part 400.

A working medium is supplied to the combustion furnace 100, preferably through a tube positioned inside the combustion furnace 100 as shown in FIG. 1. A type of the combustion furnace 100 is not limited as long as it can heat a liquid metal to its melting point or higher by supplying heat. For example, as a combustion device by supplying an oxidizing agent to a fuel such as coal, pulverized coal, oil, etc., the combustion furnace can heat the working medium. Additionally, as the working medium supplied, as a feature of the present invention, it is preferable to use a liquid metal. Further, the liquid metal is not limited, but a metal having relatively low melting point and high boiling point, e.g., tin, bismuth, lead, gallium, etc., can be preferably used.

For being in a liquid state at a temperature about 2,000° C. (in case of tin, the melting point is about 231° C. and boiling point 2,602° C. at the atmospheric pressure), the maximum temperature which can be reached in combustion reaction in a general boiler which, using the air as an oxidizing agent, the liquid metal can absorb all heat released from the combustion reaction at the atmospheric pressure and thus does not require a particular material capable of enduring high pressure when manufactured. Currently, commercialized materials can be used by themselves. In accordance with the description above, the liquid metal inside the combustion furnace 100 should be heated up to at least the melting point of the liquid metal, thereby existing in a liquid state.

The heat exchange part 200 connected to the combustion furnace 100 receives the liquid metal heated in the combustion furnace 100 as a working medium.

The heat medium injection part 300 is equipped in the heat exchange part 200. A side of the heat medium injection part 300 is connected to the heat exchange part 200 and allows a heat medium to flow, thereby performing heat exchange of the heat medium and the liquid metal inside the heat exchange part 200. The heat medium that flows therein is not limited, but water or $CO_2$, for example, may flow in. The heat medium reaches high temperature and pressure of the critical point or higher by the heat exchange and is released to the other side of the heat medium injection part 300. As a critical point of the material such as water or $CO_2$ as a heat medium which can flow in is already known, a detailed description thereof will be omitted.

The supply part 400, connected to the other side of the heat medium injection part 300, supplies the heat medium to the heat medium injection part 300 as described above, thereby supplying the heat medium to the heat exchange part 200. As shown in FIG. 1, a side of the supply part 400 is positioned close to a side of the combustion furnace 100 and enables supplying the heat medium being supplied to the heat exchange part 200 by primarily heating the same using sensible heat of offgas released from the combustion furnace.

Hereafter, the detail of the operation of the boiler is described as follows: a heat medium primarily heated in the supply part 400 and supplied to the heat medium injection part 300 flows and passes through inside the heat exchange part 200, heat exchange with the liquid metal inside the heat exchange part 200, thereby reaching high temperature and pressure of its critical point or higher, and is released through a side of the heat exchange part 200. As shown in FIG. 1, the liquid metal having temperature decreased due to the heat exchange is re-supplied to the combustion furnace 100, and a pump (P) for liquid metal supply from the heat exchange part 200 to the combustion furnace 100 may be positioned. The liquid metal supplied to the combustion furnace 100 is re-heated and re-supplied to the heat exchange part 200. This allows the liquid metal to circulate continuously, and heating and heat exchange processes are repeated.

The temperature and pressure of the heating medium are in a critical, supercritical, ultra supercritical, or hyper supercritical state depending on temperature of the liquid metal and degree of the heat exchange, and the heat medium can manufacture and use a heat medium of a desired state. In particular, a heat medium in the ultra supercritical or hyper supercritical state is not easily produced by the constitution of a conventional boiler, but can be produced in a relatively simple manufacture process by using a liquid metal.

Additionally, as described above, a heat medium in the ultra supercritical or hyper supercritical state generally requires a material, e.g., alloy steel, capable of enduring high temperature and pressure, etc. However, instead of directly supplying a heat medium to a boiler to reach high temperature and pressure states, a high-cost tube capable of enduring high temperature and pressure inside the combustion furnace 100 by obtaining heat through a liquid metal present in a liquid state in a range of an operational temperature of the combustion furnace 100 is not necessary to install as described above. Through a method of reaching high-temperature and high-pressure states by directly injecting the heat medium to a liquid metal at a high temperature supplied to the combustion furnace 100, low-cost steam and $CO_2$ with high efficiency can be produced to be used in power generation or heat supply.

Based on FIG. 2, the boiler according to another exemplary embodiment of the present invention will be described. Hereinafter, differences from the exemplary embodiment above will be mainly described, and other identical constitutions and operations will be omitted for the convenience of understanding and explanation of the invention.

FIG. 2 is a schematic diagram of a boiler according to another exemplary embodiment of the present invention, wherein the solid arrows represent the flow of the liquid metal and dashed arrows represent the flow of the heat medium. The bubbles inside the heat exchange unit represent evaporated heat medium at high temperature and pressure.

In the exemplary embodiments, two or more combustion furnaces 100 and heat exchange parts 200 can be equipped. The description below discloses an example of two combustion furnaces 100 and heat exchange parts 200.

The combustion furnace 100 consists of two combustion furnaces 100, that is, the first combustion furnace 110 and the second combustion furnace 120. The liquid metal in each combustion furnace 100 is preferably heated to different temperatures. A range of the temperature is not limited, but as described above, it is preferable that the liquid metals be heated up to at least the melting point thereof.

A number of the heat exchange parts 200 corresponding to that of the combustion furnaces 100 is equipped. As the number of the combustion furnaces 100, two heat exchange parts, that is, the first heat exchange part 210 and the second heat exchange part 220 are equipped and are connected to each heat exchange part 210, 220. Each heat exchange part 210, 220 is connected to its corresponding combustion furnace 110, 120, thereby injecting liquid metals heated at different temperatures from each combustion furnace 110, 120.

In other words, the first heat exchange part 210 is connected to the first combustion furnace 110, whereas the second heat exchange part 220 is connected to the second combustion furnace 120. The liquid metal supplied from the second combustion furnace 120 may be supplied to the working medium flow path 250 which connects the first heat exchange part 210 and the second heat exchange part 220.

A temperature of the liquid metal inside the first heat exchange part 210 is preferably higher than that of the second heat exchange part 220.

A side of the heat medium injection part 300 is connected to the second heat exchange part 220, whereas the other side is connected to the supply part 400 and receives the primarily heated heat medium from the supply part 400.

The heat medium supplied through the heat medium injection part 300 flows from the second heat exchange part 220 to the first heat exchange part 210, gradually reaching high-temperature and high-pressure states of its critical point or higher. Additionally, if it is constituted that the heat medium is released from the heat medium injection part 300 positioned inside the second heat exchange part 220, it is advantageous in that heat media having different temperatures and pressures can flow separately and be used.

Additionally, the liquid metal with decreased temperature due to the heat exchange in the first heat exchange part 210 flows to the second heat exchange part through the working medium flow path 250 which connects the first heat exchange part 210 and the second heat exchange part 220. The liquid metal with a lowered temperature is used in another heat exchange and is supplied to the second combustion furnace 120, thereby improving the heat exchange efficiency.

The exemplary embodiments of the present invention discloses a constitution having two combustion furnaces 100 and heat exchange parts 200 as an example, but a greater number of the same may be equipped. Additionally, a case in which multiple combustion furnaces 100 and heat exchange parts 200 are equipped would be clearly understood.

Hereinbelow, the boiler according to another exemplary embodiment of the present invention will be described based on FIG. 3. FIG. 3 is a schematic diagram of a boiler using a liquid metal according to still another exemplary embodiment as a working medium, wherein the solid arrows represent the flow of the liquid metal and dashed arrows represent the flow of the heat medium.

As in the description of the exemplary embodiments, differences from the exemplary embodiment above will be mainly described.

In the exemplary embodiments of the present invention, the heat exchange part 200' is positioned inside the tube 201. As a side of the tube 201 is connected to the heat medium injection part 300', the heat medium is supplied from the supply unit 400, and the supplied heat medium flows through the tube 201, thereby performing heat exchange with the liquid metal inside the heat exchange part 200'.

Hereby, in contrast to the method of direct heating, as the tube 201 is indirectly heated in a condition of relatively consistent temperature inside the liquid metal of the heat exchange part 200, it is less likely to have a breakdown due to heat and pressure and has no influence by heat transfer barrier due to slacking or fouling and corrosive gas such as a chlorine-containing compound or other sulfur compounds due to high heat, thereby obtaining an effect of remarkably extending a lifespan of the tube 201.

Additionally, in the exemplary embodiments above, a turbine which is connected to a side of the heat exchange part 200 (the other side of the tube 201 in another exemplary embodiment above) and uses heat medium released therefrom to generate power can be equipped and used for a power generation system.

In case of a turbine using steam, as the heat medium, i.e., steam, is at higher temperature and pressure, not only its efficiency improves but also a size of the turbine itself decreases. As described above, the boiler according to the present invention can produce a heat medium in an ultra supercritical to hyper critical state, which is higher than its critical point, and thus is able to construct a power generation system with high efficiency.

As described above, the boiler according to the present invention is advantageous in that it produces a heat medium in a high temperature and pressure state using a liquid metal, thereby solving a problem due to directly heating the heat medium and can relatively easily produce a heat medium at high-temperature and high-pressure states of its critical point or higher indirectly. Additionally, by generating power using the heat medium produced therefrom, a power generation system with much improved efficiency can be constructed.

Even though the embodiments of the present disclosure have been described and illustrated, the present disclosure is not limited to the specific embodiments but may be modified in various ways by those skilled in the art without departing from the scope of the present disclosure defined by the appended claims, and such modifications should not be interpreted separately from the technical feature and prospect of the present disclosure.

DESCRIPTION OF REFERENCE NUMERALS

100: Combustion furnace
110: First combustion furnace
120: Second combustion furnace
200, 200': Heat exchange part
201: Tube
210: First heat exchange part
220: Second heat exchange part
300, 300': Heat medium injection part
400: Supply part

The invention claimed is:

1. A boiler, which circulates a working medium to perform a heat exchange with a heat medium, comprising:
   a combustion furnace, in which the working medium being supplied thereinto is heated;
   a heat exchange part, which is connected to the combustion furnace and to which the working medium heated in the combustion furnace is supplied;
   a heat medium injection part, in which one side thereof is connected to the heat exchange part; and
   a supply part, which is connected to the other side of the heat medium injection part and supplies the heat medium to the heat exchange part through the heat medium injection part,
   wherein the heat exchange between the heat medium supplied in the heat medium injection part and the heated working medium is performed in the heat exchange part by direct contact,
   wherein the heat medium reaches high-temperature and high-pressure states at a threshold point or higher by means of the heat exchange, and the working medium is a liquid metal,
   wherein the threshold point is a critical point of the heat medium; and
   wherein the boiling point of the liquid metal is at least 1560 degrees Celsius at atmospheric pressure.

2. The boiler of claim 1, wherein the liquid metal, which is decreased to a temperature lower than a predetermined temperature by the heat exchange, is supplied to the combustion furnace, re-heated and re-supplied to the heat exchange part, thereby recirculating the liquid metal,
   wherein a temperature at which the liquid metal is re-heated is higher than the melting point of the liquid metal.

3. A boiler, which circulates working media to perform a heat exchange with a heat medium, comprising:
   two or more combustion furnaces, to which the working media heated up to different temperatures are supplied;
   two or more heat exchange parts, which are connected to a corresponding number of combustion furnaces and to which the working media heated at different temperatures in each combustion furnace are supplied;

a heat medium injection part, in which one side thereof supplies the heat medium to the heat exchange part with the lowest temperature among the heat exchange parts; and a supply part, which is connected to the other side of the heat medium injection part and supplies the heat medium thereto, wherein the heat exchange of the heat medium supplied from an end of the heat medium injection part and the working media is performed in two or more heat exchange parts by direct contact, wherein the heat medium gradually reaches high-temperature and high-pressure states at a threshold point or higher by means of the heat exchange, and the working medium is a liquid metal, wherein the liquid metal is in the liquid state during contact with the heat medium, and wherein the boiling point of the liquid metal is at least 1560 degrees Celsius at atmospheric pressure.

4. The boiler of claim 3, wherein the liquid metal which is decreased to a temperature lower than a predetermined temperature by the heat exchange is supplied to the combustion furnace heated at the lowest temperature among the combustion furnaces, re-heated and re-supplied to one of the heat exchange parts, thereby recirculating the liquid metal, wherein a temperature at which the liquid metal is reheated is higher than the melting point of the liquid metal.

5. A power generation system, comprising:

a boiler using the liquid metal according to claim 1 as a working medium; and a turbine for generating electrical power using a heat medium in high-temperature and high-pressure states at a threshold point or higher, wherein the heat medium is a supercritical, ultra-supercritical, or hyper-supercritical fluid.

6. The power generation system of claim 5, wherein the liquid metal is selected from the group consisting of tin, bismuth, lead, and gallium.

* * * * *